United States Patent [19]

Hipp et al.

[11] 4,257,137

[45] Mar. 24, 1981

[54] DOCK LEVELER

[75] Inventors: Steven J. Hipp, Milwaukee; Richard C. Wilde, Wauwatosa, both of Wis.

[73] Assignee: Rite-Hite Corporation, Milwaukee, Wis.

[21] Appl. No.: 69,230

[22] Filed: Aug. 23, 1979

[51] Int. Cl.³ .............................................. E01D 1/00
[52] U.S. Cl. .................................................... 14/71.3
[58] Field of Search ....................... 14/71.3, 71.5, 71.1

[56] References Cited

U.S. PATENT DOCUMENTS

| | | | |
|---|---|---|---|
| 3,255,478 | 6/1966 | Lambert | 14/71.7 |
| 3,327,335 | 6/1967 | Beckwith | 14/71.3 |
| 3,460,175 | 8/1969 | Beckwith | 14/71.3 |
| 3,486,181 | 12/1969 | Hecker | 14/71.3 |
| 3,497,893 | 3/1970 | Beckwith | 14/71.3 |
| 3,500,486 | 3/1970 | Le Clear | 14/71.3 |
| 3,636,578 | 1/1972 | Dieter | 14/71.3 |
| 4,014,486 | 3/1977 | Nelson | 14/71.3 X |
| 4,065,824 | 1/1978 | Ellis | 14/71.3 |
| 4,142,640 | 3/1979 | Kummerman | 14/71.3 X |

*Primary Examiner*—Nile C. Byers, Jr.
*Attorney, Agent, or Firm*—Neuman, Williams, Anderson & Olson

[57] ABSTRACT

A dock leveler for a dock loading surface is provided with includes a frame fixedly mounted adjacent the front edge of the surface, and an extension assembly mounted on the frame for movement between operative and inoperative modes. The assembly includes a dock panel hinged to the frame and a lip panel hinged to the dock panel. The dock panel is coplaner with the loading surface and the lip panel depends therefrom when the assembly is in the inoperative mode. A linkage is provided having pivotally connected first and second arms. An end of the first arm is pivoted to the frame and an end of the second arm is pivoted to the lip panel. Power means urges the dock panel to move from the inoperative mode to a raised position prior to assuming an operative mode. The dock panel will move to the raised position upon a predetermined external force being applied to the dock panel. A trip member is provided having a central section pivoted to the dock panel. A first end section of the trip member is engaged and moved by the first arm while the dock panel moves to the raised position. A second end section of the trip member engages and causes the lip panel to move to an extended position relative to the dock panel when the first end section is being actuated by the linkage first arm.

7 Claims, 10 Drawing Figures

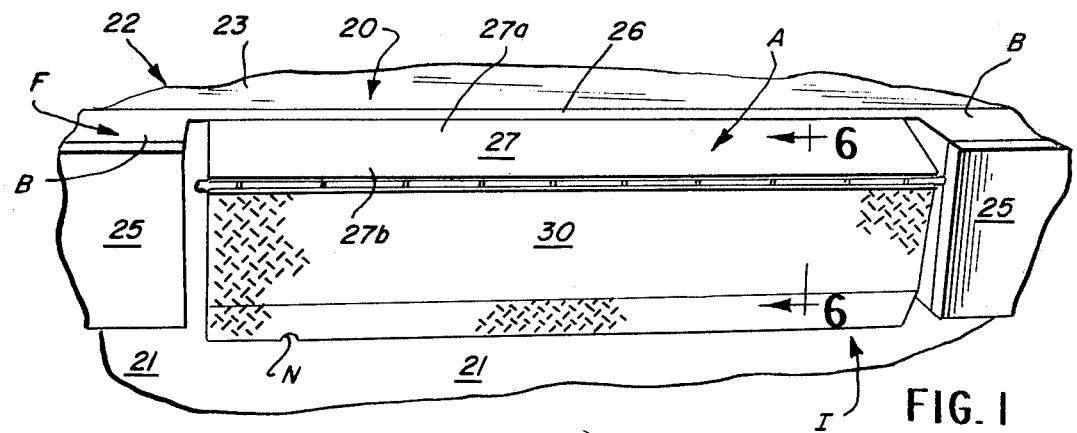
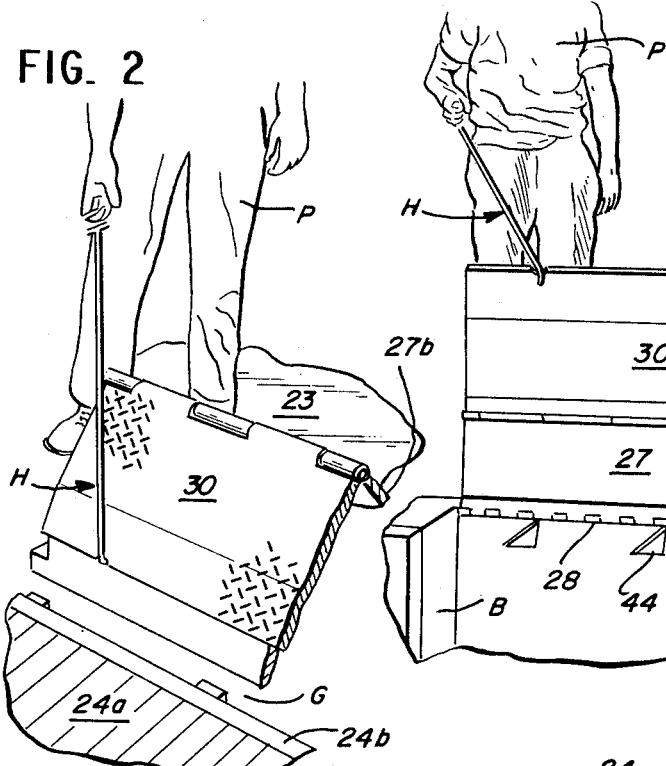
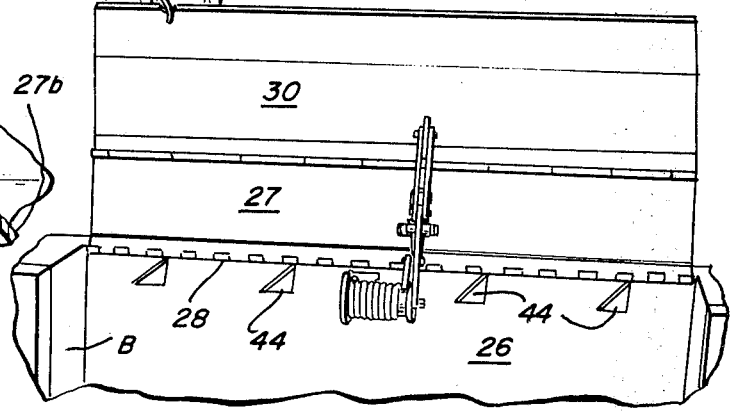
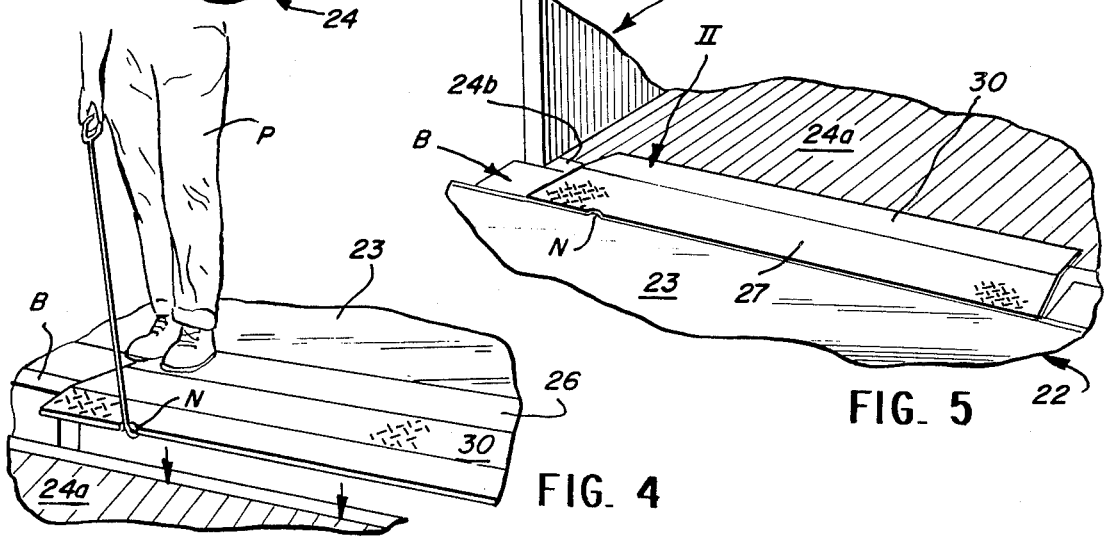

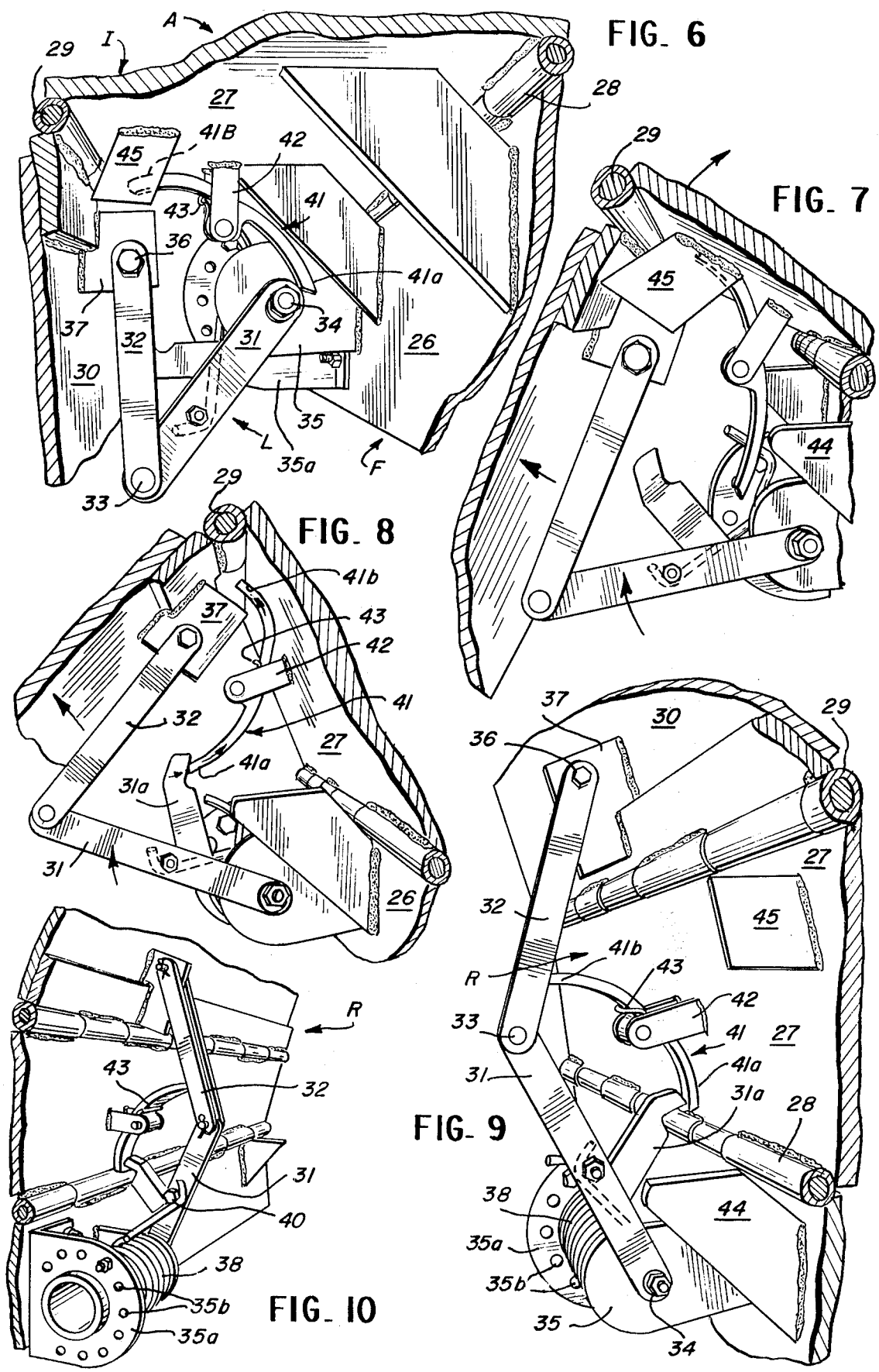

DOCK LEVELER

BACKGROUND OF THE INVENTION

Various dock levelers, sometimes referred to EOD equipment, have heretofore been provided for use in combination with dock loading surfaces or platforms. The loading surfaces or platforms are designed so as to receive trucks or trailers which have been backed into a parked position adjacent the loading surface or platform and thereby enable the truck or trailer to be loaded or unloaded by utilizing forklift trucks or other mechanical means. The dock levelers in question are intended to (a) bridge a gap which normally occurs between the end of the parked vehicle and the front of the dock loading surface and (b) to compensate for any differential in height between the dock loading surface and the bed of the parked vehicle. Because of certain design characteristics, prior dock levelers have been beset with one or more of the following shortcomings: (1) the leveler is of costly, complex construction; (2) it is difficult and awkward to install and frequently requires substantial modifications to be made to the dock loading surface; (3) it is susceptible to malfunction and requires an inordinate amount of servicing and maintenance; (4) it is susceptible to vandalsim; (5) it is incapable of accommodating trucks and trailers which vary over a wide range in size and configuration; (6) it requires a ready source of electric, pneumatic and/or hydraulic power; (7) its operation is adversely affected by certain weather conditions.

SUMMARY OF THE INVENTION

Thus, it is an object of the invention to provide an improved dock leveler which avoids all of the afore-noted shortcomings.

It is a further object of the invention to provide an improved dock leveler which is capable of withstanding abusive handling or shock caused by the truck or trailer when being moved into a parked position or by a forklift truck or the like when moving across the leveler.

It is a further object of the invention to provide an improved dock leveler which can be moved between operative and inoperative modes without requiring back-straining manual effort.

Further and additional objects appear from the description, accompanying drawings and appended claims.

In accordance with one embodiment of the invention, a dock leveler is provided which includes a frame fixedly mounted adjacent the front side of a substantially horizontal dock loading surface, and an extension assembly mounted on the frame for movement between inoperative and operative modes. The extension assembly includes an elongated dock panel having a first elongated side hingedly connected to the frame and an elongated lip panel hingedly connected to a second elongated side of the dock panel. When the assembly is in an inoperative mode, the dock panel is disposed in a substantially horizontal position wherein the exposed surface thereof is in substantially coplanar relation with the dock loading surface and the lip panel depends in a non-extended positon from the dock panel. When the extension assembly moves from an inoperative mode to an operative mode, the dock and lip panels pivot as a unit until the dock panel assumes a predetermined raised position whereupon, while the dock panel is in its raised position, the lip panel is pivoted relative to the dock panel to an extended position. When the lip panel assumes its extended position, the panels pivot as a unit towards a horizontal position until the lip panel engages the load-supporting surface of a parked vehicle whereupon the panels coact to span a gap between the front of the dock loading surface and the rear of the vehicle load-supporting surface. A linkage is provided which includes a pair of pivotally connected first and second arms. One end of the first arm is pivotally connected to the frame and a corresponding end of the second arm is pivotally connected to the lip panel. A power means is provided for biasing the extension assembly to move from the inoperative mode towards the operative mode. The biasing force of the power means alone is insufficient to move the extension assembly from the inoperative mode and requires the application of a predetermined external force to effect such movement. An elongated trip member is provided which has a center section pivotally connected to the dock panel, and one end section engaged and moved by the first arm when the extension assembly is in one segment of travel from the inoperative mode to the operative mode. A second end section of the trip member engages the lip panel and urges movement thereof to an extended position only when the one end section is engaged and being moved by the first arm of the linkage.

DESCRIPTION

For a more complete understanding of the invention reference should be made to the drawings wherein:

FIG. 1 is a fragmentary perspective view of one embodiment of the improved dock leveler mounted on the front of a dock loading surface and disposed in an inoperative mode.

FIG. 2 is a fragmentary perspective view of the dock leveler of FIG. 1 being moved from the inoperative mode towards an operative mode and showing the dock panel thereof in a raised position prior to the lip panel assuming a fully extended position relative to the dock panel.

FIG. 3 is similar to FIG. 2 but showing the lip panel in a fully extended position.

FIG. 4 is similar to FIG. 3 but showing the dock panel and extended lip panel moving as a unit from the raised position, shown in FIG. 3, towards a horizontal position.

FIG. 5 is a fragmentary perspective view looking towards the parked vehicle but showing the dock leveler in an operative mode.

FIG. 6 is a fragmentary sectional view taken along line 6—6 of FIG. 1 and showning the linkage, and various associated components when the assembly is in an inoperative mode.

FIGS. 7-8 are similar to FIG. 6 but showing the dock and lip panels in successive relative positions while the extension assembly is being moved from the inoperative mode of FIG. 1 towards the position shown in FIG. 2.

FIG. 9 is similar to FIGS. 7-8 but with the panels in the relative positions shown in FIG. 3.

FIG. 10 is a fragmentary second perspective view of the panels when in the relative positions shown in FIG. 3.

Referring now to the drawings and more particularly to FIG. 1, one embodiment of the improved dock leveler 20 is shown affixed to the front wall 21 of a loading dock 22. The dock is of conventional design and includes a horizontal loading surafce of platform 23 which is elevated above the roadway leading to the dock. The vehicle 24 to be loaded or unloaded is normally backed into a parked position adjacent the front wall 21 so that the load bearing surface or bed 24a is at approximately the same elevation as surface 23. The dock leveler 20 to be hereinafter described is intended to compensate for the height differential which might exist between the dock loading surface 23 and the vehicle bed 24a and also to span the gap G which exists between the back end 24b of the vehicle bed and the front wall 21 of the dock. Thus, the dock leveler facilitates the use of the forklift trucks or dollies for the loading and unloading operations.

The dock leveler 20 includes an elongated frame F which incorporates a pair of bumpers B which are arranged in horizontally spaced relation and project outwardly from the dock front wall 21. The outer distal end of each bumper B is provided with a conventional pad 25 against which a portion of the back end of the vehicle bed engages when the vehicle is in proper parked position. The rear portions of the bumpers B are interconnected by an elongated base member 26. The member 26 is suitably secured to the dock front wall 21 so that the upper edge of the number and upper surfaces of the bumpers B are disposed adjacent to but slightly from the dock loading surface 23.

Positioned between the bumpers and adjustably connected to the base member is an extension assembly A. The assembly is adapted to be selectively moved between operative and inoperative modes, as will be described more fully hereinafter.

The extension assembly A, as illustrated, includes an elongated dock panel 27 having an elongated edge 27a hingedly connected at 28 to the base member 26 of the frame F. The length of panel 27 is such that it substantially spans the distance between the bumpers B.

Hingedly connected to the opposite elongated edge 27b of panel 27 is an elongated lip panel 30. Panels 27, 30 are of comparable size and preferably formed of a tread plate steel and thus capable of withstanding substantial loads.

When the assembly A is in its inoperative mode I, as seen in FIG. 1, the exposed surface of the dock panel is in substantially coplanar relation with the dock loading surface 23, and the lip panel 30 depends in a non-extended position from the dock panel. When in mode I, the exposed surface of the lip panel 30, as well as the outer elongated edge 27b of panel 27, are recessed from the outer face of the bumpers B and thus are not engaged by the rear end of the vehicle when the latter is being maneuvered into a parked position.

As seen in FIGS. 6–10, there is provided on the underside of the panels, a linkage L which includes a pair of arms 31, 32 having corresponding ends thereof pivotally connected to one another at 33. Arm 31 has the other end thereof pivotally connected at 34 to a bracket 35 affixed to and projecting outwardly from the base member 26 of frame F. Arm 32, on the other hand, has the opposite end thereof pivotally connected at 36 to a bracket 37 affixed to and projecting transversely from the underside of lip panel 30.

The bracket 35 coacts with a bracket 35a, affixed to and projecting outwardly from the frame base member 26, to provide a support for a coil spring 38. One end of spring 38 is disposed within a selected one of a plurality of circularly arranged openings 35b formed in bracket 35a. The center of curvature of the openings 35b is the axis of coil spring 38. The opposite end of the coil spring engages a stub 40 formed on arm 31. By selecting one of the openings 35b for accommodating an end of spring 38, the spring bias exerted on arm 31 can be varied. The biasing effect of spring 38 on arm 31 is in a clockwise direction as viewed in FIGS. 6–9. Such bias, however, is not of sufficient magnitude by itself to cause the dock panel 27 to pivot about hinge 28 to a fully raised position R, as shown in FIGS. 9, 10. Thus, in order to move the dock panel 27 from the horizontal position (mode I) to the raised position R, it is necessary that a small external lifting force by applied to the outer edge portion 27b of panel 27 by a lifting hook H or other suitable means which may be manually manipulated to engage a notch N formed in the edge of panel 30, see FIG. 2. The amount of lifting force is relative small, thus avoiding any back strain or the like to the person P exerting the force. Once the dock panel 27 has been pivoted approximately 30°, the bias effect of spring 38 is sufficient to continue pivotal movement of the dock panel to its fully raised position R.

When the panel 27 reaches its raised position R it will remain in such position so as to enable the lip panel 30 to pivot to its fully extended position relative to panel 27, see FIGS. 3, 9 and 10.

The effect ready movement of panel 30 to its fully extended position there is provided a rocker mounted elongated trip member 41 which is carried on the underside of dock panel 27. As seen in FIGS. 9, 10, the central section of the trip member is pivotally connected to a bracket 42 which is affixed to and projects from the panel 27. One end section 41a of the trip member 41 is disposed within the path of travel of a protuberance 31a formed on linkage arm 31 as the dock panel 27 moves to its fully raised position R.

The opposite end section 41b of the trip member is sandwiched between a portion of bracket 37 and the underside of dock panel 27 when the latter is in its horizontal position and the extension assembly A is in the inopertive mode I, see FIG. 6. As the dock panel begins its upward pivotal movement about hinge 28, the trip member 41 will remain in a dormant state and move as a unit with panel 27 until the latter has reached an angle of approximately 50°–60° to the horizontal whereupon the protuberance 31a makes contact with the end section 41a, see FIG. 8. As the panel 27 continues to pivot towards its fully raised position R, the protuberance 31a will force the trip member 41 to pivot about bracket 42 which in turn will cause end section 41b to push against the bracket 37 and force the lip panel 30 to begin movement thereof to its fully extended position relative to the dock panel. Once the trip member 41 has commenced the pivotal movement of the lip panel 30, the bias of spring 38 will take hold and through the linkage arms 31, 32 cause the lip panel to move to its fully extended position, see FIGS. 3, 9 and 10.

Once the lip panel has assumed its fully extended position while the dock panel is in its fully raised position R, the panels will move as a unit towards a horizontal position, see FIG. 4, until the extended lip panel has the outer free edge portion thereof come to rest upon the loading bearing surface 24a of the vehicle bed. Because of the hinge connection between panels 27 and 30, the latter may not assume a coplanar relation when there is a height differential between the bed surface and the dock loading surface. Once the lip panel is resting upon the vehicle bed surface, the assembly A is in its operative mode II, see FIG. 5, and forklift trucks, dollies or the like may readily move back and forth over the exposed surfaces of the panels.

In order to be assured that the end section 41a of trip member 41 will be engaged by protuberance 31a of arm 31 when the dock panel 27 is moved from mode I to raised position R, a light biasing spring 43 is provided. The spring 43 exerts a clockwise force on the trip member as seen in FIG. 9.

When the assembly A moves from mode I to mode II, the dock panel 27 initially pivots to the raised position carrying with it lip panel 30 while the latter retains a non-extended position with respect to panel 27. With the lip panel 30 remaining in such non-extended position, the elongated free edge of the lip panel will be disposed above the plane of the vehicle load-bearing surface 24a thereby enabling the lip panel 30 to pivot freely relative to panel 27 to a fully extended position without interference. Once the panel 30 assumes its fully extended position, the two panels will pivot as a unit about hinge 28 towards a horizontal position until the underside of panel 30 engages the rear portion of the vehicle bed surface.

When the loading or unloading operation has been completed, the parked vehicle will move away from the front wall of the dock while the extension assembly A is in its operative mode II, thereby causing the extended lip panel 30 to pivot to a depending position. The movement of panel 30 to the depending position is not abrupt but is controlled because of the biasing effect of coil spring 38 exerted on the linkage L and in turn the panel 30.

The dock panel 27 is maintained in a horizontal position by a plurality of stops 44 affixed to and protruding from base member 26 of frame F. To control the dependent position of panel 30 relative to the dock panel 27, a limit stop 45 is affixed to and projects from the underside of panel 27, see FIGS. 6-7. The stop 45 is disposed adjacent the hinge connection 29 between panels 27 and 30.

Thus, it will be noted that a dock leveler of simple inexpensive construction has been provided which does not require an electrical, pneumatic or hydraulic power source to enable the leveler to operate properly. The various components of the leveler are readily accessible, when required, for servicing or replacement of parts. The improved leveler may be readily installed on existing loading docks without requiring modifications or structural changes being made to the latter.

Various changes in the size, location, and configuration of the components comprising the improved dock leveler may be made without departing from the scope of the invention.

We claim:

1. A dock leveler comprising a fixedly mounted frame for disposition adjacent to the front edge of a dock loading surface; an extension assembly adjustably mounted on said frame for selective movement between operative and inoperative modes; said assembly including an elongated dock panel hingedly connected to said frame whereby said panel has an exposed surface thereof in substantially coplanar relation with the dock loading surface when the assembly is in an inoperative mode, an elongated lip panel hingedly connected to said dock panel, the hinge axes being in spaced substantially parallel relation, said lip panel assuming a depending non-extended position relative to said dock panel when said assembly is in said inoperative mode, and, when in an operative position, extending outwardly from said dock panel for engaging the load-supporting surface of a vehicle parked adjacent the dock loading surface and coacting with said dock panel for spanning a gap formed between the dock loading surface and the vehicle load-supporting surface, power means mounted on said frame and biasing said extension assembly from said inoperative mode to said operative mode, the bias of said power means being insufficient to effect movement of said assembly from said inoperative mode without a predetermined external pivoting force being applied thereto, a linkage interconnecting said frame and lip panel and including pivotally connected first and second arms, said first arm having an end thereof pivotally connected to said frame and said second arm having an end thereof pivotally connected to said lip panel, and an elongated trip member having a central section pivotally connected to and carried by said dock panel, one end section of said trip member engaging and being actuated by said one arm during a predetermined segment of travel of said extension assembly while moving from an inoperative mode to an operative mode, and a second end section of said trip member engaging and actuating said lip panel to assist movement thereof to an extended position relative to said dock panel only when said one end section is in engagement with and actuated by said one arm.

2. The dock leveler of claim 1 wherein the first arm of the linkage includes a protuberance disposed intermediate the ends thereof and being adapted to engage the trip member one end section during the predetermined segment of travel of said extension assembly.

3. The dock leveler of claim 2 wherein the power means includes a spring in resilient engagement with said first arm.

4. The dock leveler of claim 1 wherein, when said extension assembly moves from an inoperative mode to an operative mode, said dock panel initially pivots from a substantially horizontal position to a substantially raised position, and then pivots in the opposite direction from the raised position towards a horizontal position; said lip panel initially moves substantially as a unit with said dock panel when the latter pivots to the raised position, pivots relative to the dock panel to a substantially fully extended position when said dock panel is substantially in said raised position, and then moves substantially as a unit with said dock panel when the latter is moving from said raised position towards said horizontal position until the extended lip panel is engageable with the load-suporting surface of the parked vehicle.

5. The dock leveler of claim 1 wherein thepivotal axis of said trip member is substantially parallel to the hinge axes of said dock and lip panels.

6. The dock leveler of claim 5 wherein the first and second arms of said linkage form an included angle of substantially less than 180° for all relative positions of said dock and lip panels.

7. The dock leveler of claim 5 wherein said trip member includes a biasing means urging the second end section thereof towards said dock panel and the one end section thereof into a positon wherein said linkage one arm will engage same.

* * * * *

UNITED STATES PATENT AND TRADEMARK OFFICE
CERTIFICATE OF CORRECTION

PATENT NO. : 4,257,137
DATED : March 24, 1981
INVENTOR(S) : Steven J. Hipp, Richard C. Wilde It is certified that error appears in the above-identified patent and that said Letters Patent are hereby corrected as shown below:

Column 1, Line 26 - "vandalism" is misspelled

Column 1, Line 45 - "will" should be inserted before "appear"

Column 2, Line 67 - Delete "surafce of" and substitute therefor --surface or--

Column 3, Line 23 - "number" should be --member--

Column 3, Line 25 - "recessed" should be inserted before "from"

Column 4, Line 24 - Delete "The" and substitute therefor --To--

Signed and Sealed this

Eleventh Day of August 1981

[SEAL]

Attest:

GERALD J. MOSSINGHOFF

Attesting Officer         Commissioner of Patents and Trademarks